UNITED STATES PATENT OFFICE.

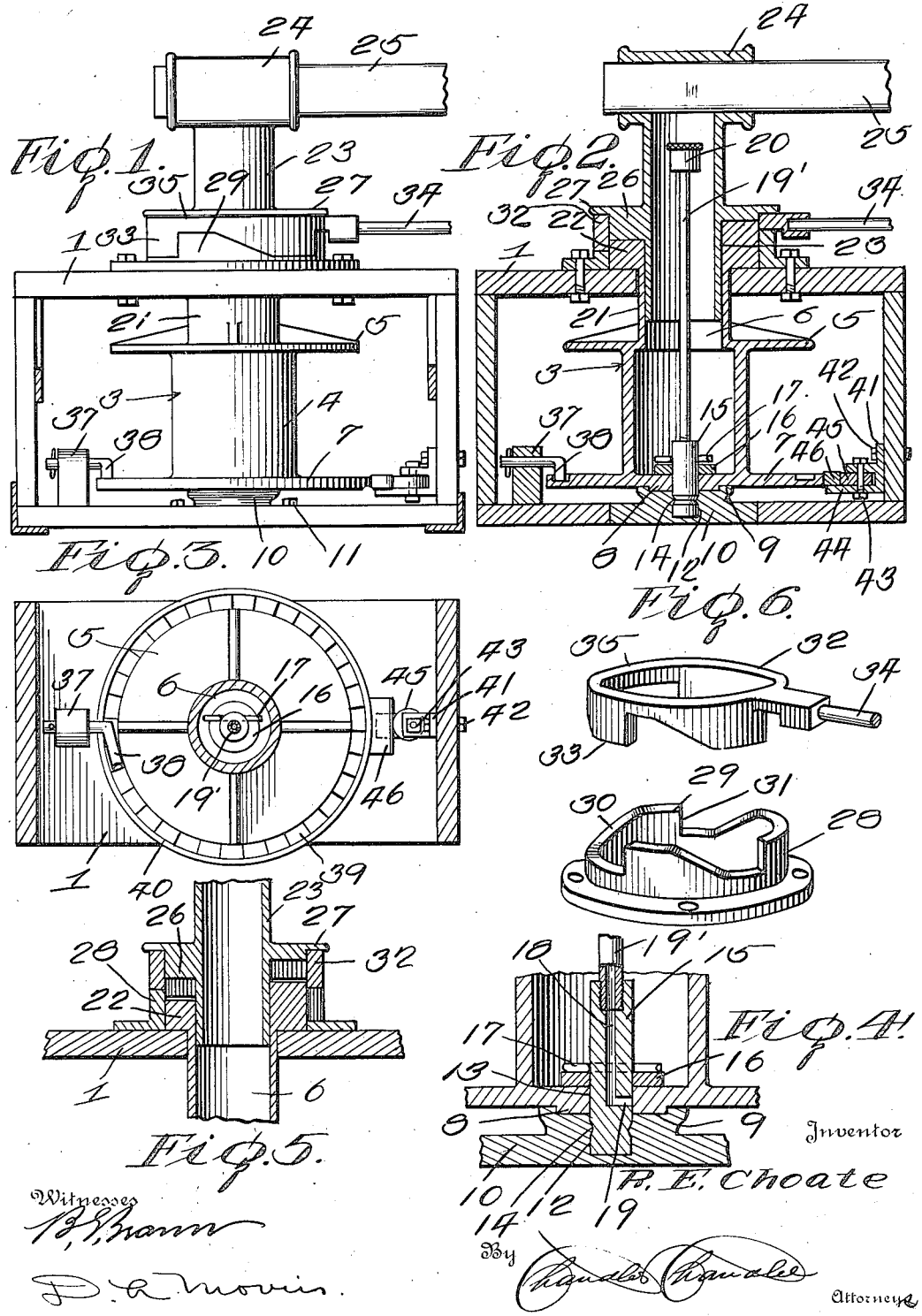

ROY E. CHOATE, OF CEDAR RAPIDS, IOWA.

CAPSTAN.

1,204,408.                    Specification of Letters Patent.    Patented Nov. 14, 1916.

Application filed April 29, 1914. Serial No. 835,304.

*To all whom it may concern:*

Be it known that I, ROY E. CHOATE, a citizen of the United States, residing at Cedar Rapids, in the county of Linn, State of Iowa, have invented certain new and useful Improvements in Capstans; and I do hereby declare the following to be a full, clear, and exact description of the invention, such as will enable others skilled in the art to which it appertains to make and use the same.

This invention relates to a capstan.

An object of the invention is to provide a device of this character wherein the operating mechanism for actuating the spool may be thrown out of engagement with the said spool to facilitate the operation of the device.

A further object of the invention is to provide means for automatically oiling the said spool.

With these and other objects in view, my invention consists in the combination and arrangement of parts as herein set forth and subsequently claimed.

Referring to the drawing: Figure 1 is a side elevation of my device. Fig. 2 is a vertical sectional view thereof. Fig. 3 is a horizontal section. Fig. 4 is an enlarged view of the oiling mechanism. Fig. 5 is an enlarged perspective view, showing the clutch mechanism disengaged. Fig. 6 is a view of the means for disengaging the members of the clutch, the elements thereof being separated.

Referring to the drawings by reference characters wherein like parts are indicated by like characters: My device comprises a casing 1 of rectangular formation and supported on a suitable base. Mounted within the casing 1 and extending vertically therein is a spool 3 having a cylindrical body portion 4 and an upper circular flange 5 in which an aperture 6 is formed.

Integrally formed with the body portion 4 is a circular flange 7. On the lower central portion of this flange is a circular projection 8 which fits into cup-shaped member 9 formed on the upper end of a bearing member 10 which is held in place on the bottom of the casing 1 by the bolts 11. This bearing member has a hole 12 extending partially through the same but in registration with a hole 13 in the flange 7. Extending upwardly in the hole 12 and held thereby by projections 14 is a hollow cylindrical bearing cup 15 on which a spool is rotatably mounted. Securing this spool to the said bearing member 15 is a washer 16 which encircles the bearing member and is held on the upper end thereof by a cotter pin 17 and bears against the inner face of the flange 7 to hold the said spool in place. This bearing member 15 has a longitudinal hole 18 therein and communicating with this hole is a transverse hole 19 which extends through the outer surface of the bearing member 15. Through these holes grease is adapted to pass to the projection 8 and the cup 9 so that when the spool is rotating in the said member 9 it may be effectively oiled.

Extending upwardly through the hole 6 in the upper flange 5 of the spool and through the spool is a pipe 19′ having a grease cup 20 on its upper end through which pipe the grease is adapted to be supplied to the hole 18 for the purpose above described. Formed integrally with the upper flange 5 of the spool 3 is an upwardly projecting hollow cylindrical member 21 having formed integrally on its upper end a clutch section 22. Rotatably mounted in this cylindrical member 21 and extending upwardly therefrom is a second cylindrical member 23 having a sweep receiving member 24 in which is removably mounted a sweep 25. Formed on the outer surface of this member 23 adjacent the lower end thereof is a clutch section 26 adapted to coöperate with the clutch section 22 on the member 21. Formed integrally with this last mentioned clutch section is a circular flange 27.

Secured to the upper face of the casing 1 is a casting 28 having three upwardly extending projections 29, the rear portions of which are inclined as at 30, and the forward portions of which are abruptly formed, as at 31. Coöperating with this member is a second casting 32 having downwardly extending projections 33 of the reverse formation of the projections on the member 28 and adapted to coöperate therewith. Secured to this member 32 and projecting outwardly therefrom is an operating arm 34 by which the member 32 may be rotated and by virtue of the formation of the said projections on the said member and on the member 28 pushed upwardly from the said member 28 for the purpose as will hereinafter appear. These two members 28 and 32 just described encircle the clutch members 22 and 26 and the upper edge 35 of the member 32 bears against the under side of the flange 27 so that when the said member 32 is lifted upwardly on the casting 28 the upper clutch member 26 is raised out of engagement with the lower clutch member 22 on the spool 3 and the said spool 3 may then be rotated without rotating the sweep arm 25. By this construction when it is desirable to loosen the cable on the spool 3 this may be done by disengaging the members of the clutch in the manner above described and the said spool may then be rotated without moving the sweep 25 or detaching the horses from the device.

Formed in the casing adjacent one lower corner thereof is a bearing 37 in which is rotatably mounted a pawl 38 which coöperates with a ratchet 39 on the outer edge of the lower flange 7 of the spool 3, which ratchet is formed of teeth in a groove 40 and which teeth lie entirely below the upper surface of the said flange 7 so that the rope which is wound upon the spool 3 will not in any way come in contact with the said teeth and prevent the successful operation of the device. This pawl and ratchet coöperate to normally prevent the spool from rotating in the opposite direction to which the sweep is being turned.

On the side of the casing opposite to that on which the pawl is pivoted is a bracket 41 secured to the casing by bolts 42 having an inwardly projecting bifurcated portion 44. In this portion is pivoted on the bolt 43 a cam 45 which when rotated presses against a brake shoe 46 slidably mounted on the member 41 and operates to press the same against the periphery of the flange 7.

By providing the members 28 and 32 with three projections coöperating with each other to raise the clutch portions out of engagement with each other and consequently to raise the member 23 and the sweep 25, the said raising member will operate more successfully than any that has been previously on the market, for the reason that by providing a three-point support described all rocking motion of the member 23 would be obviated and the said member held in its vertical position against the tendency of the sweep 25 to rock the same.

From the foregoing description it may be readily seen that I have provided a capstan which will be automatically oiled at the portion where the spool rotates in its bearing, thus obviating the necessity of manually lifting said spool from its bearing and inserting grease thereunder.

I have further provided a device wherein the clutch for operating the spool may be thrown out of operative position so as to allow the spool to rotate freely, and whereby the portion of the device to which the sweep is attached will be held in a vertical position and all tendency to deviate from such position will be obviated.

I do not wish to be limited to the particular construction of my device shown, for it is obvious that numerous mechanical changes may be made within the scope of the claim without departing from the spirit of my invention.

What is claimed is:—

In a device of the class described, a casing, a spool revolubly mounted in said casing, a flange formed on the lower end of said spool, a projection on the lower face of said flange, a cup shaped bearing in which said projection is mounted, said cup shaped member having a hole extending longitudinally therethrough, a hollow cylindrical member secured in said hole and projecting upwardly through the said flange, means for holding said spool on said cylindrical member, a hole formed longitudinally in said member and a transverse hole in communication therewith and in communication with the said cup shaped member to supply grease thereto, an upwardly extending pipe secured to the upper end of said cylindrical member and a grease cup attached to said pipe.

In testimony whereof, I affix my signature, in the presence of two witnesses.

ROY E. CHOATE.

Witnesses:
W. L. CRISSMAN,
M. R. ZILO.